July 8, 1952 N. F. BARNES 2,602,368
COLOR MATCHING APPARATUS
Filed Sept. 13, 1950 2 SHEETS—SHEET 1

Inventor:
Norman F. Barnes,
by Paul A. Frank
His Attorney.

July 8, 1952     N. F. BARNES     2,602,368
COLOR MATCHING APPARATUS

Filed Sept. 13, 1950     2 SHEETS—SHEET 2

Inventor:
Norman F. Barnes,
by Paul A. Frank
His Attorney.

Patented July 8, 1952

2,602,368

UNITED STATES PATENT OFFICE 2,602,368

COLOR MATCHING APPARATUS

Norman F. Barnes, Schenectady, N. Y., assignor to General Electric Company, a corporation of New York Application September 13, 1950, Serial No. 184,683

6 Claims. (Cl. 88—14)

My invention relates to color matching apparatus and more particularly to apparatus for matching colors through the medium of their spectrophotometric curves.

The problem of mixing color elements such as pigments or dyes to produce or match a desired color shade is aggravated by the fact that each color element responds in a different and visually indeterminate manner to the various wave lengths of light which comprise the visible spectrum. This response which an object of particular color shade exhibits, usually in terms of reflected light, to the various wave lengths of light in the spectrum is known as its spectrophotometric curve. Because the human eye is able to discern only the composite effects of this spectrophotometric curve in terms of a particular color shade, visual mixing of a number of color elements in an effort to match a desired color shade is an extremely difficult and laborious trial and error process.

Accordingly, an object of my invention is to provide an apparatus which enables a rapid and simple determination of the relative amounts of color elements such as pigments or dyes which are necessary to produce a desired color shade.

Another object is to provide an apparatus with which the spectrophotometric curve of a given color shade can be visually compared with the combined spectrophotometric curves of a number of color elements so that an indication may be obtained of the relative amounts of the various color elements which are necessary to match a given color shade.

A further more specific object of my invention is to provide an apparatus whereby a Fourier analysis of the spectrophotometric curve of a given color shade may be easily obtained. The particular Fourier curve analyzing and integrating network described hereinafter, however, forms a portion of the subject matter described and claimed in my application Serial No. 280,957, filed on April 7, 1952, as a division of the present application.

Figure 1:
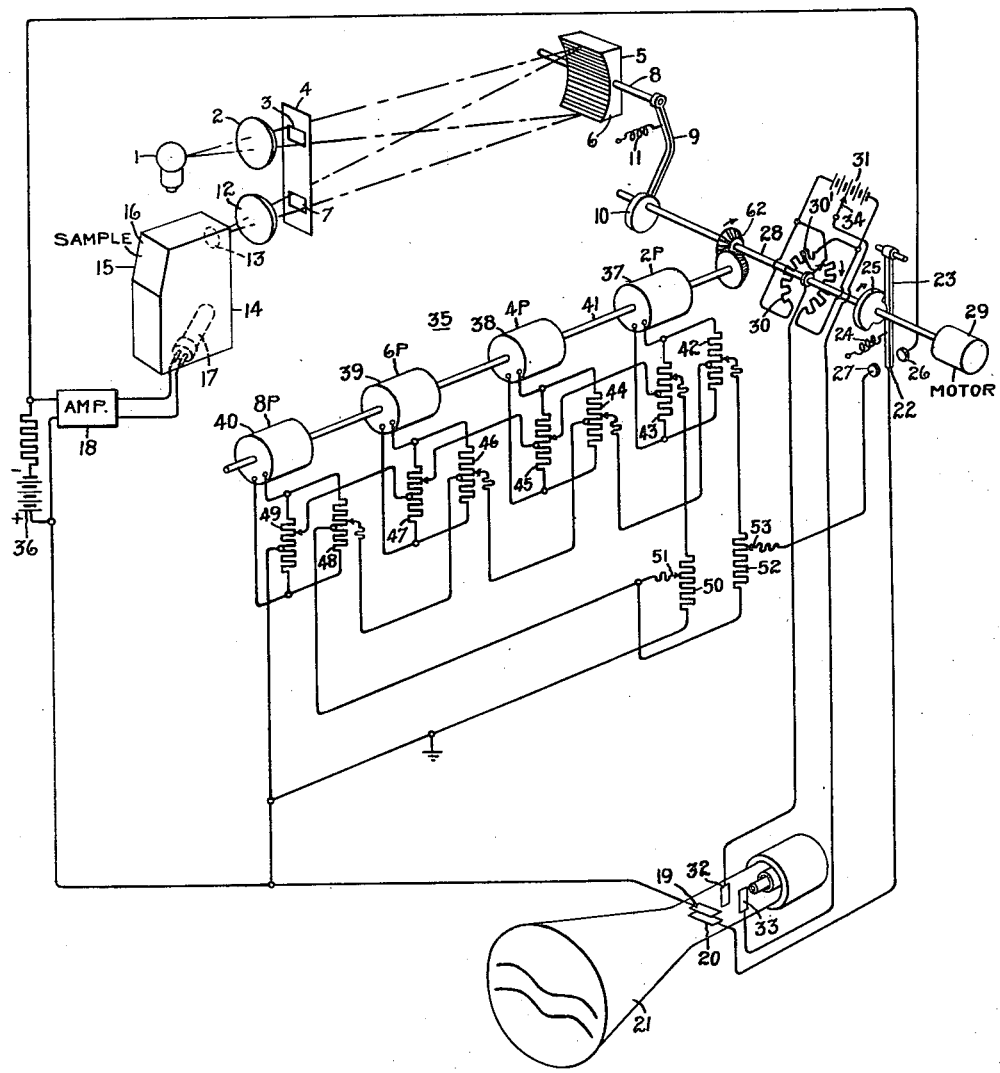
Figure 2:
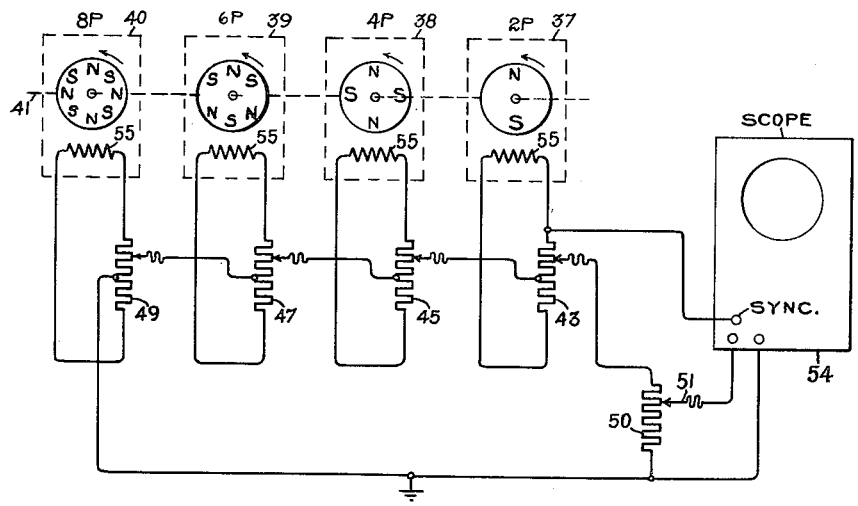
Figure 3:
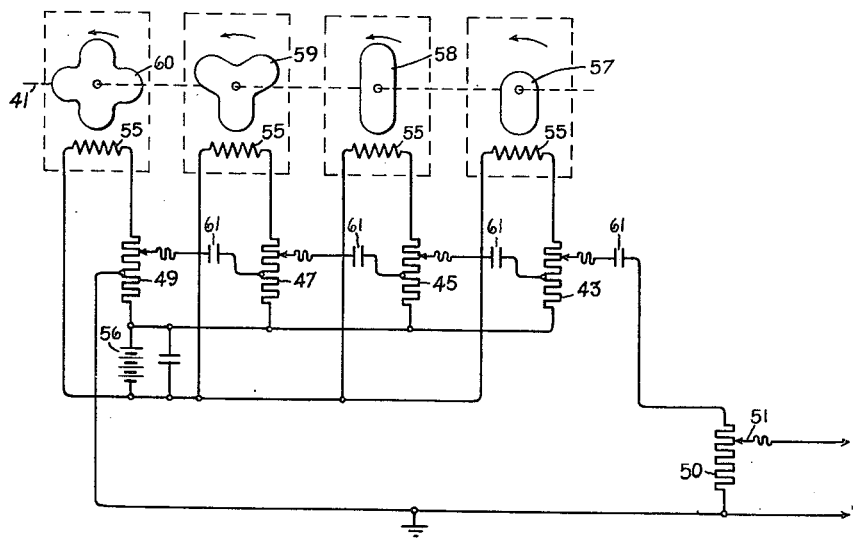

The novel features which I believe to be characteristic of my invention are set forth with particularity in the appended claims. My invention itself, however, together with further objects and advantages thereof can best be understood by reference to the following description taken in connection with the accompanying drawings in which Fig. 1 is a perspective diagrammatic view of apparatus embodying my invention, Fig. 2 is a circuit diagram showing various details of a frequency generating and integrating network of the apparatus illustrated in Fig. 1 together with means for calibrating various electric elements employed in this frequency generating network, and Fig. 3 is a diagrammatic view illustrating an alternative construction of the frequency generating network of Fig. 1. In the drawings similar reference numerals indicate similar circuit elements.

In general, a preferred form of my invention includes an apparatus which produces the spectrophotometric curve of a color shade to be matched, and a type of Fourier integrating and analyzing circuit which generates electrical currents of fundamental and harmonic frequencies in determinable relative amounts. The spectrophotometric curve of each color element to be employed in matching the color shade is represented on this Fourier curve integrating circuit by a separate series of generated currents of relative fundamental and harmonic frequencies. The electric quantities in each series are then combined in varying amounts until a resulting curve of electric values is obtained which matches the spectrophotometric curve of the desired color shade. The relative intensity of each series in the matching curve gives a direct indication of the relative amounts of each color element required. In addition, the apparatus may be employed to give a rapid Fourier curve analysis of the relative fundamental and harmonic frequencies which comprise the spectrophotometric curve of a desired color shade.

Referring to Fig. 1, I have shown my invention in one form as comprising a source 1 of substantially white light which is focused by a lens 2 through an upper slot 3 in a light confining member 4 upon a spectrum producing means 5 which may conveniently comprise a concave surface diffraction grating 6 with a light reflecting face as illustrated. The diffraction grating 6 functions to separate the white light into a plurality of adjacent beams of monochromatic light while the concave mirrored surface of the grating 6 simultaneously reflects and focuses these reflected beams in the direction of a lower slot 7 in the light confining member 4. A conventional prism with a light reflecting rear face may, of course, be substituted for the diffraction grating but additional focusing means must then be employed.

The diffraction grating 6 is arranged to be rocked on a shaft 8 by an arm 9 which rides against a cam 10 under the tension of a spring 11. When the grating is rocked, the reflected monochromatic light of the various wave lengths in the visible spectrum pass over the lower slot 7 and are successively transmitted therethrough. The light transmitted through slot 7 is focused by a lens 12 through a light receiving aperture 13 of a light integrating compartment 14. A window 15 of this light integrating compartment 14 is constructed to be covered by a sample 16 of the color shade to be matched. This sample 16 is aligned so that it reflects the light passing into the compartment 14 through the aperture 13 upon a photoelectric element 17, preferably located within the compartment 14. For transparent materials the sample may alternatively be placed in the optical beam between slot 7 and lens 12.

The output voltage produced by the photoelectric device 17, which is responsive to the intensity of the successive monochromatic light beams reflected from the sample 16, is amplified by an amplifier 18 and is applied between a pair of vertical deflection plates 19 and 20 of a cathode ray electric discharge device 21 through a switch 22. A contacting arm 23 of the switch 22 is constructed to move against the tension of a spring 24 between two contacting positions by the rotation of a cam 25. During one half cycle of rotation of cam 25, arm 23 is held against a contact 26 and the circuit is completed from the output of the amplifier 18 to the deflection plates 19 and 20. During the alternate half cycle of the rotation of cam 25, the output circuit of amplifier 18 is broken and the arm 23 is held against an opposite contact 27 to complete the output circuit from a Fourier curve integrating and analyzing network 35 to be described hereinafter. The cams 10 and 25 are rotated on the same shaft 28 driven by a motor 29 and their rotational positions on the shaft 28 are relatively adjusted so that the output circuit of the amplifier 18 is completed during the period of one scanning sweep of the spectrum across slot 7.

Also attached to the shaft 28 is a movable arm 30' of a dual-sided potentiometer 30, each side being respectively connected across a source of voltage designated as battery 31. The movable arm 30' of the potentiometer 30 is connected to one horizontal deflection plate 32 of the cathode ray discharge device 21 while the other horizontal deflection plate 33 is connected to a variable tap 34 of the battery 31. The rotational position of the movable arm 30' of the dual potentiometer 30 is adjusted with relation to the shaft 28 so that two successive and substantially identical saw-tooth sweep voltages are applied between the horizontal deflection plates whose periods coincide with the alternate contact engaging periods of switch 22 and the back-and-forth scanning periods of the diffraction grating 6. Coincident with one sweep voltage the entire spectrum passes across slot 7, the switch 22 completes the output circuit of the amplifier 18, and the electric signals representing the spectrophotometric curve of the color shade of sample 16 are applied to the vertical deflection plates 19, 20 to produce a delineation of the spectrophotometric curve of the color sample 16 on the screen of the cathode ray discharge device 21. Coincident with the next sweep voltage, the diffraction grating 6 returns to its initial position, the output circuit of the amplifier 18 is disconnected by switch 22 and the output voltage function of a Fourier curve analyzing circuit, designated generally by the numeral 35, is connected to the vertical deflection plates of the discharge device 21 to delineate a second curve upon the screen of the discharge device 21. In order to separate the two curves upon the screen if desired, a biasing voltage, such as may be provided by a battery 36, is superimposed upon the output voltage of the amplifier 18.

The Fourier curve integrator 35 includes a plurality of alternating current generators 37, 38, 39 and 40 all energized by the rotation of a common shaft 41 and producing alternating currents in associated output circuits whose frequencies are harmonically interrelated. One of the generators, such as generator 37, may have two poles while the remaining generators are four-poled, six-poled and eight-poled respectively in order to produce output voltages of frequencies corresponding to a fundamental frequency and its second, third and fourth harmonics. Additional generators having an increasing number of poles may be driven by shaft 41 to produce output voltages of even higher harmonic frequencies, if desired.

A separate bank of impedances are connected in parallel across the output terminals of each of the generators. Impedances designated by the numerals 42 and 43 are connected in parallel across the output terminals of the two-poled generator 37, while the impedances designated by the numerals 44 and 45, 46 and 47, and 48 and 49, are respectively connected in a similar manner across the output terminals of the four-poled generator 38, the six-poled generator 39 and the eight-poled generator 40. Although I have shown only two impedances in each bank associated with a particular generator, it will be appreciated that many more parallel impedances may be employed depending upon the number of color elements to be used in matching the desired color shade.

Each of the impedances in each bank of impedances is connected in sequential tandem relation with an associated impedance in each of the other banks of impedances in order to produce a voltage function which represents the spectrophotometric curve of a particular color element. One group of impedances, such as impedances 43, 45, 47 and 49, are interconnected to provide a voltage function representing the spectrophotometric curve of one color element; while another group of impedances, such as impedances 42, 44, 46 and 48 are interconnected in a similar manner providing a voltage function representing the spectrophotometric curve of a different color element. Each of these impedances 42 through 49 has a fixed center tap and a variable tap. The center tap of one impedance in one of the groups, such as impedance 49, is directly connected to the grounded deflection plate 19 while the adjustable tap of this impedance 49 is connected to the center tap of impedance 47. Similarly, the adjustable tap of impedance 47 is connected to the fixed center tap of impedance 45, and the adjustable tap of impedance 45 is connected to the fixed tap of impedance 43. The movable tap of impedance 43 is connected to one side of a voltage dividing potentiometer 50 whose other side is connected back to the grounded center tap of impedance 49. It will thus be seen that the voltage developed between the fixed center tap and the adjustable tap of each impedance in this group is connected in series circuit relation with the potentiometer 50, and a voltage function appears across this potentiometer 50 which is the algebraic sum of the harmonically interrelated voltages derived from these individual impedances. The magnitude as well as the phase (either positive or negative) of any harmonic frequency component in this voltage function can then be easily adjusted by merely varying the position of the adjustable tap of the impedance element associated with the generator of that particular frequency voltage.

The movable arm 51 of the potentiometer 50, at which a voltage proportional to this voltage function is produced, is connected to the center tap of one of the impedances, such as impedance 48 in the second group of impedances employed to produce a curve representing the spectrophotometric curve of a different color element. This second group of impedances designated by numerals 42, 44, 46, and 48 is then interconnected in series circuit relation with a second potentiometer 52 in the same manner that the first group of impedances are connected in series relation with the potentiometer 50. A movable arm 53 of this second potentiometer 52 is then directly connected to the contact 27 of the switch 22. When the arm 23 of switch 22 engages contact 27 the algebraic sum of the voltage function appearing at the movable arm 51 of potentiometer 50 and the voltage function appearing at the movable arm 53 of potentiometer 52 is applied across the vertical deflection plates 19 and 20 of the discharge device 21. The relative magnitude of these voltage functions may be adjusted by merely varying the movable arms 51 and 53 of the potentiometers 50 and 52 respectively.

In order to synchronize the period of these harmonically interrelated voltage functions to the saw-tooth sweep voltage applied to the horizontal deflection plates 32, 33, the common shaft 41 is preferably driven, through such means as gears 62, by the shaft 28 upon which the movable arm 30' of the sweep voltage producing dual potentiometer 30 is mounted. The gear ratio is preferably 1:1 although other integral gear ratios may be employed. Alternatively, the shafts 41 and 28 may be separately driven by synchronous motors.

In the operation of the color matching apparatus of Fig. 1 the movable arm of one of the potentiometers, such as potentiometer 52 is placed in its zero voltage position such that a direct connection is made from the movable arm 51 of the other potentiometer 50 to the contact 27. The movable arm 51 is then adjusted adjacent the center of its range, and a sample of one of the color elements to be used to obtain a desired color shade is placed over the window 15 of the light integrating compartment 14 or if the sample is transparent, in the optical beam between slot 7 and lens 12. The motor 29 is turned on and two curves are delineated upon the screen of the discharge device; one curve representing the spectrophotometric curve of the sample color element and the other curve representing the voltage function produced by the harmonically interrelated voltages developed across the first group of impedances 43, 45, 47 and 49. The harmonic content of this voltage function is then adjusted by varying the movable taps of these impedances until the curve produced by the output of the Fourier integrating and analyzing network 35 assumes the same configuration as the spectrophotometric curve of the sample color element. The voltage function appearing across potentiometer 50 now represents the spectrophotometric curve of this first color element.

This first sample color element is then replaced by a second color element to be used in matching the desired color shade, and the movable arm 53 of potentiometer 52 is adjusted to the center of its range, while the movable arm 51 of the potentiometer 50 is adjusted to its grounded position. The curve matching procedure outlined above is then repeated using the second group of impedance elements 42, 44, 46 and 48 instead of the first group of impedances 43, 45, 47 and 49, which are maintained unaltered in their previously calibrated positions.

After the spectrophotometric curve of this second color element is matched by the adjustment of this second group of impedances, or of as many more groups as may be needed, the second sample color element is replaced by a sample of the color shade to be matched. The relative positions of the movable arms 51 and 53 of potentiometers 50 and 52 respectively are then adjusted until the curve produced by the Fourier network 35 matches the spectrophotometric curve of the sample color shade. Since the position of the movable arm of each potentiometer 50 and 52 represents the intensity of the spectrophotometric curve of a particular color element, the relative positions of the movable arms 51 and 53 may be calibrated to indicate the relative amounts of a particular color element that is necessary to match the sample color shade.

It is evident that the color matching apparatus illustrated in Fig. 1 may also be employed to give a rapid Fourier curve analysis of a sample color shade. In this application only one group of impedances, such as impedances 42, 44, 46 and 48 need be employed. The movable arm 51 of impedance 50 is turned to its grounded position, a sample of the color shade to be matched is placed over window 15 of light compartment 14; and with movable arm 53 of potentiometer 52 adjusted somewhere adjacent its central position, the adjustable taps of this group of impedances (42, 44, 46, and 48) are varied until the two curves which are delineated upon the screen of the discharge device 21 assume the same configuration. The relative positions of the adjustable taps of these impedances then represent the relative amounts of fundamental and harmonic frequencies which comprise the spectrophotometric curve of the sample color shade.

Referring now to Fig. 2, I have shown an alternative means of calibrating each group of impedances in the Fourier curve integrating and analyzing network 35 when the spectrophotometric curve of a particular color element is already known. Only one group of impedances (43, 45, 47 and 49) are shown in Fig. 2 and are connected in series circuit relation with potentiometer 50 in a manner similar to Fig. 1. The voltage developed between the movable arm and the grounded end of potentiometer 50 is connected to the vertical deflection plates of an external oscilloscope 54 and the sweep circuit of the oscilloscope is synchronized to the fundamental frequency voltage of the Fourier network by a connection to the output circuit of the two-poled generator, as indicated. The adjustable taps of impedances 43, 45, 47 and 49 may then be varied until the configuration of the curve delineated upon the oscilloscope matches the configuration of the known spectrophotometric curve of the particular color element concerned.

Referring now to Fig. 3, I have shown in diagrammatic form an alternative construction of the harmonic frequency generators together with an alternative Fourier curve integrating and analyzing network. In order to simplify the drawing, only one group of impedances is illustrated in conjunction with these harmonic frequency generators. In this Fourier curve integrating and analyzing circuit a unidirectional current is maintained through an inductance 55 associated with each of the generators by a parallel connection across a source of voltage, such as battery 56. The generators each have a rotating cam-like magnetically permeable member driven by a common shaft which functions to vary the reluctance of its associated inductance 55 at harmonically interrelated frequencies. One cam-like member 57, which produces the fundamental frequency may comprise an eccentrically mounted substantially circular plate which passes close to its associated inductance once each revolution. The remaining cam-like members 58, 59 and 60 have 2, 3 and 4 symmetrically disposed extensions respectively, and therefore vary the reluctance of their associated coils at twice, three times and four times the fundamental frequency respectively. Capacitors 61 are connected in series with the output voltage produced by each impedance in order to transmit only the alternating current component of the voltages produced across these impedances. The remainder of the circuit is identical to that of Fig. 1.

Although I have shown particular embodiments of my invention many modifications may be made and I intend, therefore, by the appended claims to cover all such modifications as fall within the true spirit and scope of my invention.

What I claim as new and desire to secure by Letters Patent of the United States is:

1. In combination a photoelectric device arranged to receive light reflected from an object, means for illuminating said object with light including a group of adjacent wave lengths, means for selectively limiting the illuminating light to a substantially single wave length of said group and for periodically varying the selection of wave lengths by said limiting means through a predetermined range, means operating synchronously with said wave length selecting means and controlled by the output of said photoelectric device for producing a first curve representing the energy reflected by said object at the various wave lengths, and means including a fundamental and harmonic frequency generating and integrating network for producing a second curve similar to said first curve, said last means including means for indicating the relative amounts of fundamental and harmonic frequency components in said second curve.

2. In combination, means for producing a spectrophotometric curve of light reflected from an object of a given color shade, fundamental and harmonic frequency generating and integrating means for producing a plurality of series of electric quantities, each of said series representing the spectrophotometric curve of a respective color element comprising said color shade, electric integrating means for providing a curve representing the algebraic sum of all said series, curve tracing means arranged to delineate along respective adjacent axes both the spectrophotometric curve and the summation curve, and means for adjusting and indicating the relative amplitudes of each of said electric quantity series to obtain a summation curve which matches the spectrophotometric curve of said color shade.

3. In combination, means for producing a spectrophotometric curve of light reflected from an object of a particular color shade, fundamental and harmonic frequency generating and integrating means for producing a periodically recurring series of electric quantities constituting an electric curve, means operative in response to said electric curve, means for delineating said electric curve, and means associated with said frequency generating means for adjusting and indicating the relative amounts of fundamental and harmonic frequency components comprising said electric quantities to obtain an electric curve which matches said spectrophotometric curve and thereby to provide a Fourier analysis of said spectrophotometric curve.

4. In combination, a cathode ray electric discharge device having a screen and ray deflecting means for producing two visible traces on said screen, means connected to said ray deflecting means for varying one of said traces in accordance with the spectrophotometric curve of a desired color shade, an electric Fourier-curve integrating network producing a plurality of voltage functions each representing the spectrophotometric curve of a respective color element comprising said color shade, electric integrating means providing the algebraic sum of all said voltage functions and connected to energize said ray deflecting means to vary the other of said traces on said screen in response to said integrated voltage functions, means for adjusting the amplitude of each voltage function in order to match said other trace to said one trace, and means for indicating the relative amplitude of each voltage function.

5. A color matching apparatus comprising a photo electric device arranged to receive light reflected from an object, means for periodically scanning said object with a series of substantially monochromatic light beams comprising the visible spectrum, means including a fundamental and harmonic frequency generating and integrating network for providing a periodically recurring voltage function having adjustable and determinable frequency components, and a cathode ray electric discharge device operating synchronously with said scanning means for producing two curves, one curve being controlled by the output of said photoelectric device and representing the energy reflected by said object when subjected to the various monochromatic light beams, and the other curve being controlled by said voltage function.

6. A color matching apparatus comprising a photoelectric device arranged to receive light from an object, means for periodically scanning said object with a series of substantially monochromatic light beams, means including a fundamental and harmonic frequency generating network for producing a plurality of periodically recurring simultaneous voltage functions having adjustable frequency components, means for adjusting and indicating the relative amplitude of each voltage function, electric integrating means for providing a summation voltage function representing the algebraic sum of all said individual voltage functions, and a cathode ray electric discharge device operating synchronously with said scanning means and producing two curves, one curve being controlled by the output of said photoelectric device and the other curve being controlled by said summation voltage function.

NORMAN F. BARNES.

REFERENCES CITED

The following references are of record in the file of this patent:

UNITED STATES PATENTS

| Number | Name | Date |
|---|---|---|
| 1,901,400 | Marrison | Mar. 14, 1933 |
| 2,084,760 | Beverage | June 22, 1937 |
| 2,088,297 | Koenig | July 27, 1937 |
| 2,122,499 | Stocker | July 5, 1938 |
| 2,159,790 | Freystedt et al. | May 23, 1939 |
| 2,240,722 | Snow | May 6, 1941 |
| 2,280,524 | Hansen | Apr. 21, 1942 |
| 2,339,754 | Brace | Jan. 25, 1944 |
| 2,388,727 | Dench | Nov. 13, 1945 |
| 2,411,741 | Michaelson | Nov. 26, 1946 |
| 2,484,618 | Fisher | Oct. 21, 1949 |